Patented Sept. 23, 1952

2,611,763

UNITED STATES PATENT OFFICE 2,611,763

AMPHOTERIC VINYL INTERPOLYMERS

Giffin D. Jones, Midland, Mich., assignor to General Aniline & Film Corporation, New York, N. Y., a corporation of Delaware No Drawing. Application December 23, 1948, Serial No. 67,073

10 Claims. (Cl. 260—80.5)

This invention relates to amphoteric interpolymers of vinyl and vinylidene compounds.

It is an object of the invention to provide novel interpolymers of vinyl and vinylidene compounds which are amphoteric, i. e., soluble in aqueous alkaline and acid solutions. Another object of the invention is to provide interpolymers which are compatible with natural gelatin, so that mixtures of the interpolymers with gelatin in aqueous solution yield clear unreticulated films on evaporation, and in general, have substantially the same capacity to form gels as similar solutions containing gelatin alone.

Natural gelatin differs in some of its properties from synthetic polypeptides, especially in its unusual capacity to form aqueous gels. Another distinction lies in its enhanced amphoteric properties which are apparently due to the presence of acidic and basic groups along its polypeptide chains. In attempting to prepare synthetic gelatin substitutes, particularly of types adapted to be used jointly with gelatin, many water-soluble polymers have been found incompatible with gelatin, especially under acid or alkaline conditions, in that aqueous gelatin solutions containing them yield cloudy or reticulated films on evaporation, and the gelling capacity of the solutions provided by gelatin alone was considerably impaired. Synthetic polymers compatible with gelatin in the foregoing sense are desirable as adjuvants in gelatin compositions, e. g. for use in the preparation of photographic films and papers, either in the silver halide emulsion layer or in other layers such as filter layers, subbing layers, and the like.

I have discovered that interpolymers of polymerizable vinyl and vinylidene compounds (i. e., polymerizable compounds containing the characteristic group $CH_2=C<$) in which one of the component monomers contains a basic radical and another component monomer contains a free acid radical, both of which radicals retain their identity in the resulting interpolymer, have amphoteric properties more or less resembling those of natural gelatin in that they dissolve in aqueous acid and basic solutions. Moreover, such interpolymers are generally compatible with gelatin in the sense indicated above in at least one of such aqueous solutions, possibly as a result of the similarity of their amphoteric properties to those of gelatin.

The solubility of the interpolymers of my invention in substantially neutral aqueous solutions depends on the individual character of the component monomers, and can be controlled by selection of the acidic and basic monomer components, or by inclusion of one or more additional interpolymerizable $CH_2=C<$ monomer components in the polymerization mixture, which contain neutral water-solubilizing groups or non-water-solubilizing characteristics, in proportions yielding the desired degree of water-solubility or insolubility in the resulting interpolymer with respect to neutral aqueous solutions. Similarly, by selection of the acidic and basic components as well as inclusion of the aforesaid additional monomer components in the interpolymer, other physical properties of the latter, such as melting point, adhesive properties, solubility in non-aqueous solvents, and the like, can be varied or controlled.

Acidic monomers suitable for inclusion in the amphoteric interpolymer of my invention include, for example, $CH_2=C<$ compounds containing free acidic groups such as carboxyl and sulfo groups, e. g. acrylic acid, methacrylic acid, α-chloracrylic acid and vinyl sulfonic acid; while basic $CH_2=C<$ monomers suitable for interpolymerization with the aforesaid acidic monomers include compounds containing basic nitrogen atoms, e. g. 2-vinyl pyridine, dialkylaminoalkyl methacrylate (e. g., dimethylaminoethyl methacrylate), methacrylamino pyridine, and the like.

The mol ratio of the acidic and basic monomer components in the interpolymers of this invention can be varied over a wide range depending upon the relative basicity or acidity desired in the resulting polymer. For most purposes the mol ratio of the aforesaid components ranges from 1:3 to 3:1 in the preparation of the interpolymer.

As additional interpolymer components which do not contain acidic or basic groups, interpolymerizable $CH_2=C<$ monomers can be used which contain such substituents as amide, hydroxyl, ester groups, and the like, e. g. acrylamide, methacrylamide, N - ethanol - methacrylamide, vinyl alcohol or its esters, and similar compounds. The proportion of such neutral monomer components to the basic and acidic components of my interpolymers can be varied over a wide range. For example, the mol ratio of such additional components to the combined molar amounts of the acidic and basic components can range from minor proportions to a ratio as high as 9:1 while still retaining the amphoteric properties of the resulting interpolymer.

Preparation of the interpolymers of my invention can be conveniently carried out, for example, by preparing a mixture of the monomeric components in alcoholic solution (e. g. methanol or ethanol), or in the absence of a solvent, and polymerizing at temperatures ranging from sub-atmospheric temperatures to moderately elevated temperatures (e. g. from −30 to 50° C.), in the presence of a polymerizing catalyst such as benzoyl peroxide or ultraviolet light. The resulting interpolymer can be isolated from the reaction mixture by usual methods such as evaporation, precipitation and the like. The interpolymers are soluble in aqueous alkaline and acid solutions to form viscous compositions, and are generally compatible with natural gelatin in aqueous acid or alkaline solution, or in acid as well as alkaline solution, and sometimes also in neutral solutions. Thus, such solutions containing the interpolymer with gelatin yield clear unreticulated films and have substantially the same gel-forming capacity as similar aqueous solutions containing natural gelatin alone.

Preparation of amphoteric interpolymers of the type contemplated in accordance with my invention is illustrated in the following examples wherein parts and percentages are by weight, unless otherwise indicated.

*Example 1*

3.03 parts of vacuum distilled 2-vinyl pyridine and 1.65 parts of methacrylic acid were dissolved in 7.5 parts of methanol, and the solution irradiated with ultraviolet light at −30° C. for 3 days in evacuated sealed tubes. The resulting interpolymer which remained largely in solution was recovered in the form of a tan-colored powder amounting to about 4 grams on evaporating the reaction mixture and drying in a vacuum desiccator. The interpolymer was insoluble in aqueous solutions but dissolved in dilute aqueous alkaline or acid solutions, indicating that it was amphoteric.

*Example 2*

1.35 parts of vacuum distilled 2-vinyl pyridine and 3.1 parts of methacrylic acid were dissolved in 7.25 parts of methanol and polymerized in the same manner described in the foregoing example. A considerable amount of the resulting interpolymer separated from the solution. The reaction mixture was dissolved in 60 parts of 5% aqueous sodium hydroxide, neutralized with 5% sulfuric acid to a pH of 6.8, and evaporated to a more concentrated solution amounting to about 50 parts. On addition of acetone, the interpolymer was precipitated in crude form and separated from the aqueous solution. Upon drying and extracting with dimethyl formamide, 2.5 parts of a tan-colored water-soluble powder was obtained, yielding a foaming acid-reacting aqueous solution. Neutralization of the solution caused precipitation of the interpolymer, while acidification resulted in dissolution of the product. The product was also soluble in dilute aqueous alkali. The resulting alkaline solution was compatible with gelatin. Thus, an alkaline solution containing the interpolymer, together with gelatin, was prepared by dissolving 0.5 gram of the interpolymer in 1 cc. of 0.1 N aqueous sodium hydroxide solution, and added to 9 cc. of an aqueous solution containing 11% of hide gelatin. A similar solution of the interpolymer with bone gelatin was also prepared. Films cast from these two solutions formed gels melting at 29.5° C. and 31.5° C., respectively, said melting points being the same as the melting points of gels prepared from the 11% gelatin solutions containing no interpolymer.

*Example 3*

2.6 parts of 2-vinyl pyridine, 2.85 parts of methacrylic acid and 5.0 parts of acrylamide were dissolved in 6.70 parts of methanol, and subjected to polymerization by irradiation with ultraviolet light at 40° C. for 3 days in sealed evacuated tubes. The reaction mixture was then stirred into hot water, whereby a viscous milky suspension was formed. The solution became clear upon neutralizing with 5% aqueous sodium hydroxide, and retained its clarity upon evaporation. The interpolymer was found to be soluble in both acid and alkaline solution. For example, 0.1 gram samples of the interpolymer dissolved in 1 cc. portions of 0.1 N aqueous sodium hydroxide and in 0.1 N sulfuric acid. The resulting solutions were added, respectively, to 9 cc. portions of 11% aqueous bone and hide gelatin solutions, and the resulting four solutions were coated on glass and dried. The resulting films were clear and unreticulated, indicating complete compatibility with gelatin in either acid or alkaline aqueous solution.

*Example 4*

2.0 parts of 2-vinyl pyridine, 2.15 parts of methacrylic acid and 5.0 parts of methacrylamide were dissolved in 5.15 parts of methanol, and the resulting mixture polymerized by irradiating with ultraviolet light at 40° C. for 3 days in a sealed evacuated tube. The interpolymer which precipitated from the reaction mixture was stirred with hot water, and 1.1 parts of an insoluble polymer separated from the solution. After evaporating the resulting milky aqueous solution to a quantity of about 40 parts, the interpolymer contained therein was precipitated by adding acetone, yielding 2.6 parts of interpolymer which was dried at 60° C. The latter product was soluble in alkaline as well as acid aqueous solutions. Alkaline solutions prepared by dissolving 0.1 gram samples of the interpolymer in 1 cc. of 0.1 N sodium hydroxide were added, respectively, to 9 cc. samples of 11% aqueous bone and hide gelatin solutions. The resulting solutions of gelatin and the interpolymer formed clear unreticulated films when coated and dried on a glass surface.

*Example 5*

A solution of 26.5 grams of 2-vinyl pyridine and 21.5 grams of methacrylic acid in 100 cc. of methanol was added in amounts varying from 0.5 cc. to 10 cc. to a series of 5 cc. samples of N-ethanol-methacrylamide, and the total volume of the resulting solutions was made equal by addition of methanol. The resulting samples were placed in sealed evacuated glass tubes and subjected to polymerization by irradiation with ultraviolet light at 40° C. for 3 days. The amounts of the aforesaid methanol solution which were added to the series of samples of N-ethanolmethacrylamide were as follows:

| | |
|---|---|
| 0.5 cc. | 4.0 cc. |
| 1.0 cc. | 6.0 cc. |
| 2.0 cc. | 10.0 cc. |

The interpolymer formed in each sample was recovered by precipitation with acetone in the form of white powders, the yields ranging from 1.6 to 4 grams. Each of the polymers thus obtained yielded a moderately viscous aqueous solution of which all but the last were clear, the last being slightly turbid. All of the interpolymers produced were soluble in both acid and alkaline aqueous solutions.

Instead of the methacrylic acid of the examples, other acidic $CH_2{=}C{<}$ monomers of which the acid function is retained in the resulting polymers can be used, e. g. vinyl sulfonic acid, or acrylic acid. Similarly, instead of 2-vinyl pyridine, other basic $CH_2=C<$ monomers in which the basic function is likewise retained in the polymer can be used, e. g. methacrylamino pyridine or dialkylaminoalkyl methacrylate (dimethylaminoethyl methacrylate) can be used. Moreover, instead of the acrylamide or methacrylamide employed in the examples as a neutral polymerizable $CH_2=C<$ monomer, other neutral monomers such as vinyl alcohol or its esters can be used.

The interpolymerization mixture may contain one or more of the basic and/or acid $CH_2=C<$ monomers, and if desired, more than one additional neutral $CH_2=C<$ compound as components for the resulting interpolymer.

As indicated by the tests set out in the examples, the interpolymers of this invention are amphoteric and compatible with gelatin in that they yield clear unreticulated films therewith, and do not modify the gelling power of aqueous gelatin solutions.

Variations and modifications which will be obvious to those skilled in the art can be made in the details of the foregoing procedures, without departing from the scope or spirit of the invention.

I claim:

1. A process for preparing an amphoteric vinyl interpolymer, which comprises preparing a mixture of polymerizable monomers consisting of 2-vinyl pyridine, methacrylic acid, and acrylamide in methanol solution, the mol ratio of 2-vinyl pyridine to methacrylic acid being within the range of 1:3 to 3:1, and the combined molar proportions of 2-vinyl pyridine and methacrylic acid being at least 10% of the monomer mixture; and subjecting said solution to polymerization at a temperature of about 40° C. by irradiation with ultraviolet light.

2. A process for preparing an amphoteric vinyl interpolymer, which comprises preparing a mixture of polymerizable monomers consisting of 2-vinyl pyridine, methacrylic acid, and methacrylamide in methanol solution, the mol ratio of 2-vinyl pyridine to methacrylic acid being within the range of 1:3 to 3:1, and the combined molar proportions of 2-vinyl pyridine and methacrylic acid being at least 10% of the monomer mixture; and subjecting said solution to polymerization at a temperature of about 40° C. by irradiation with ultraviolet light.

3. A process for preparing an amphoteric vinyl interpolymer, which comprises preparing a mixture of polymerizable monomers consisting of 2-vinyl pyridine, methacrylic acid, and N-ethanol-methacrylamide in methanol solution, the mol ratio of 2-vinyl pyridine to methacrylic acid being within the range of 1:3 to 3:1, and the combined molar proportions of 2-vinyl pyridine and methacrylic acid being at least 10% of the monomer mixture; and subjecting said solution to polymerization at a temperature of about 40° C. by irradiation with ultraviolet light.

4. An amphoteric interpolymer of which the monomer components consist of a compound containing the group $CH_2=C<$ and a basic radical, a compound containing the group $CH_2=C<$ and an acid radical, said radicals being retained in the interpolymer structure, and a neutral compound containing the group $CH_2=C<$, the molar proportions of the combined amounts of the acidic and basic components in the interpolymer being at least 10% of its total composition.

5. An amphoteric interpolymer of which the monomer components consist of a monovinyl pyridine, a compound containing the group $CH_2=C<$ and an acid radical, said radical being retained in the polymer structure, and a neutral compound containing the group $CH_2=C<$, the molar proportions of the combined amounts of the acidic and vinyl pyridine components of the interpolymer being at least 10% of the total interpolymer composition, and the mol ratio of said acidic and vinyl pyridine components in the interpolymer being within the range of 1:3 to 3:1.

6. An amphoteric interpolymer of which the monomer components consist of 2-vinyl pyridine and methacrylic acid in a mol ratio of from 1:3 to 3:1, and acrylamide, the combined molar proportions of 2-vinyl pyridine and methacrylic acid being at least 10% of the total interpolymer composition.

7. An amphoteric interpolymer of which the monomer components consist of 2-vinyl pyridine and methacrylic acid in a mol ratio of from 1:3 to 3:1, and methacrylamide, the combined molar proportions of 2-vinyl pyridine and methacrylic acid being at least 10% of the total interpolymer composition.

8. An amphoteric interpolymer of which the monomer components consist of 2-vinyl pyridine and methacrylic acid in a mol ratio of from 1:3 to 3:1, and N-ethanol-methacrylamide, the combined molar proportions of 2-vinyl pyridine and methacrylic acid being at least 10% of the total interpolymer composition.

9. A process for preparing an amphoteric interpolymer, which comprises preparing a mixture of which the components consist of a compound containing the group $CH_2=C<$ and a basic radical, a compound containing the group $CH_2=C<$ and an acid radical, said radicals being retained in the resulting interpolymer structure and a neutral compound containing the group $CH_2=C<$, the combined molar proportions of said acidic and basic monomers being at least 10% of the mixture, and subjecting the mixture to polymerization at a temperature from −30° to 50° C. in the presence of a polymerizing catalyst.

10. A process for preparing an amphoteric interpolymer, which comprises preparing a mixture of which the components consist of a monovinyl pyridine, a compound containing the group $CH_2=C<$ and an acid radical, said radical being retained in the interpolymer structure, and a neutral compound containing the group $CH_2=C<$, the combined molar proportions of the monovinyl pyridine and acidic monomer component being at least 10% of the mixture, and the mol ratio of said vinyl pyridine component to said acid component being within the range of 1:3 to 3:1, and subjecting said mixture to polymerization at a temperature from −30° to 50° C. by irradiating with ultraviolet light.

GIFFIN D. JONES.

REFERENCES CITED

The following references are of record in the file of this patent:

UNITED STATES PATENTS

| Number | Name | Date |
|---|---|---|
| 2,138,762 | Harmon | Nov. 29, 1938 |
| 2,138,763 | Graves | Nov. 29, 1938 |
| 2,484,420 | Minsk et al. | Oct. 11, 1949 |
| 2,540,984 | Jackson | Feb. 6, 1951 |